Sept. 12, 1961 W. E. BUCK 2,999,420
CONTINUOUS WRITING STREAK CAMERA
Filed March 31, 1958

INVENTOR.
WILLARD E. BUCK
BY
Fryer - Johnson
ATTORNEYS.

United States Patent Office 2,999,420
Patented Sept. 12, 1961

2,999,420
CONTINUOUS WRITING STREAK CAMERA
Willard E. Buck, Boulder, Colo., assignor to Beckman & Whitley, Inc., San Carlos, Calif., a corporation of California
Filed Mar. 31, 1958, Ser. No. 724,993
2 Claims. (Cl. 88—16)

This invention relates to streak cameras of the continuous writing type employed for the study of transient events such for example as the phenomena of explosion spark-discharge, flash-tube, shock-wave and others.

In operation, such a camera records or plots on film the progress of an event against rectangular coordinates where the vertical axis represents space and the horizontal axis represents time. To accomplish this, the image of the event under study must move relative to the film upon which the phenomena is recorded. Since this movement represents time on the plot and since the entire event often takes place in a few microseconds the relative movement of the image and film must be extremely fast in order to produce a plot that is readily readable.

One known method of streak photography comprises supporting film on the inner cylindrical surface of a drum and spinning the drum at a high rate of speed while an image of the event is focused on the film by a lens and mirror system. This method has several disadvantages which limit the capacity and hinder the operation of the camera. For example the speed required calls for a driving means with an output of several horse power and the conventional electric motor drive must be large and bulky compared to the size of the camera. Bearing friction and air friction cause excessive temperatures which may destroy the film. Furthermore expansion of the drum due to centrifugal stress varies the focal distance from the lens to the film.

It is the object of the present invention to overcome the above mentioned and other disadvantages of conventional streak cameras and to provide such a camera that is smaller and lighter in construction, that will operate at considerably lower temperatures and higher speeds than presently known cameras of this type, and to provide means to adjust lens position to the size that the drum assumes at any given speed.

The foregoing, as well as other objects and advantages are accomplished in part by the provision of an air turbine drive so embodied in the construction of the camera that it produces the required high-speed rotation of the film drum and at the same time exhausts a cooling flow of air within the camera housing and about the exterior of the drum. Means are also provided to produce a visible indication of the drum speed and to adjust the lens to compensate for the variation in size of the drum at different speeds.

Figure 1:
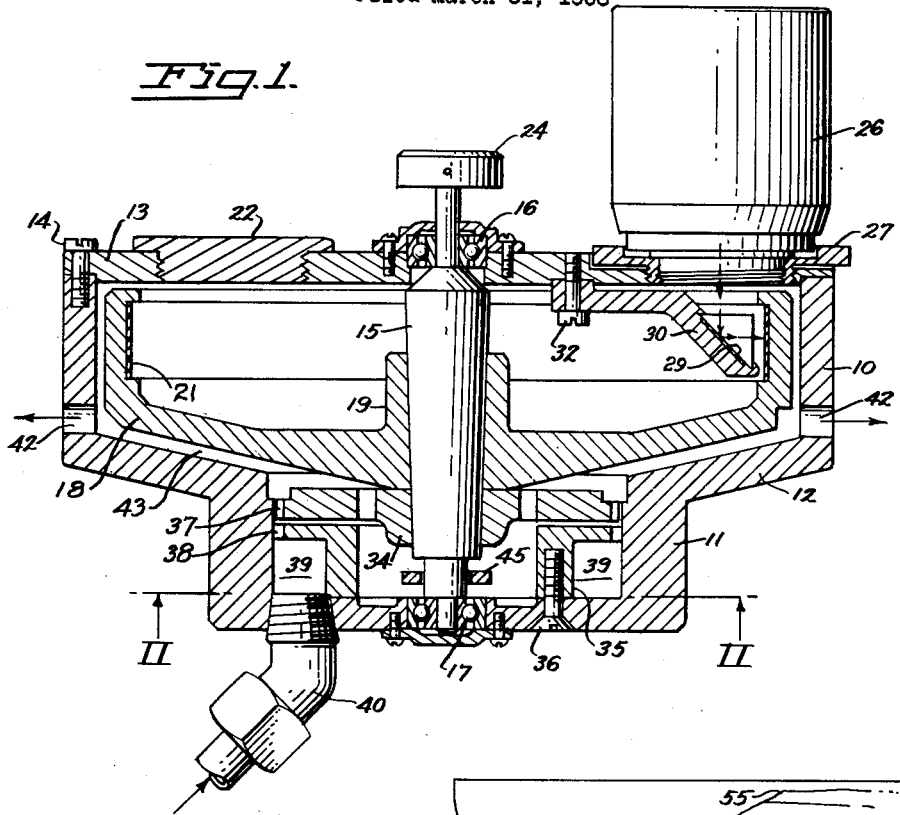
Figure 3:
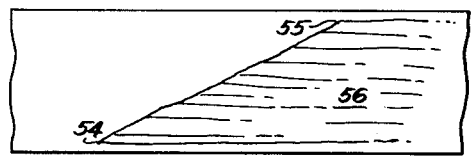
Figure 2:
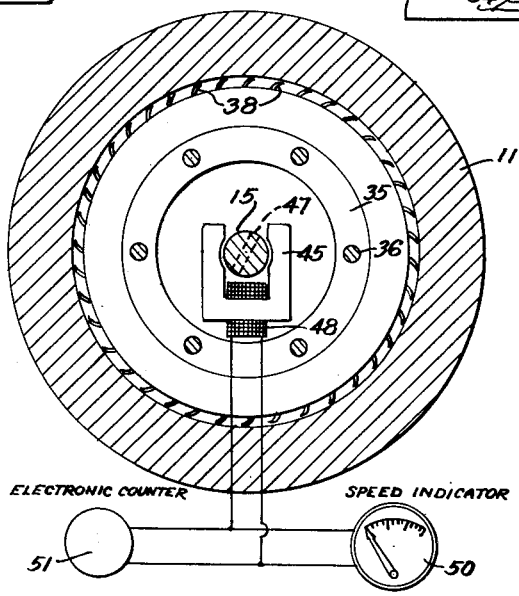

The invention is disclosed in detail in the following specification by reference to the accompanying drawings in which FIG. 1 is a central sectional view through a camera embodying the present invention;

FIG. 2 is a section taken on the line II—II of FIG. 1 and illustrating schematically the circuits for an electrical speed indicator and counter; and FIG. 3 is an enlarged framentary view of a piece of film exposed to an event being studied with the aid of such a camera.

Referring first to FIG. 1 of the drawings, the camera of the present invention is illustrated as comprising a cylindrical drum housing 10 and an integrally formed turbine housing 11 joined to the drum housing as by an inclined flange-like portion 12. A cover 13 is secured to the open side of the drum housing as by means of cap screws, one of which is illustrated at 14. A tapered shaft 15 extends centrally through the drum housing and turbine housing to form a common support for the drum and the rotor of the turbine and is supported in bearings, one of which, shown at 16, is disposed in the cover and the other, shown at 17, is disposed in the end wall of the turbine housing.

The drum which supports the film is illustrated at 18 and has a hub portion 19 tightly fitted to the tapered shaft 15 for rotation therewith. The drum is formed with an inner annular groove or recess for a strip of film 21. A film loading opening is provided in the cover and is normally closed by a threaded plug 22. The loading of the film in cameras of this type is sometimes accomplished with a film loader which enables transfer of the film into the body of the camera without exposing it to light but the loader of the present camera forms no part of this invention and is, therefore, not illustrated. The film, which is in the form of an elongated strip is approximately the length of the inner circumference of the drum and need not be fastened in place because of the centrifugal force resulting from the high speed at which the drum is rotated while the film is being exposed. An externally disposed hand knob 24 is provided on an extension of the shaft 15 for manipulation of the drum to facilitate the loading of film.

A suitable lens or lens assembly, not shown, is carried in a lens mount 26 which is threadedly supported in a lens adjusting disc 27. The disc 27 is also threadedly supported in a suitable opening in the cover 13. An image of the event being studied is focused by the lens onto the film 21 by way of the mirror surface of a prism 29 which causes the image to follow a right angular path as indicated by the arrows in FIG. 1. The mirror 29 is supported by a bracket 30 which is in turn supported by the cover 13 as by means of a cap screw shown at 32.

As previously mentioned, the high speed at which the drum 18 is rotated causes expansion or enlargement of the drum size and, while this enlargement may be measured in thousandths of an inch, the size of the drum varies sufficiently at different speeds of operation of the camera to materially effect the definition of the image on the film. To compensate for variations in the size of the drum, the lens adjusting disc 27 is rotated in its threaded support to vary the effective distance between the lens and the film. This is separate and in addition to the conventional adjustment of the lens for attaining initial focus of the event to be studied. If desired, the face of the disc 27 and the face of the cover 13 may be calibrated to indicate the proper position of the lens corresponding to various speeds of the drum.

In the turbine housing 11, a turbine rotor 34 is tightly fitted on the tapered shaft 15 and a turbine stator 35 is secured in the housing as by means of cap screws, one of which is illustrated at 36. The rotor has turbine blades 37 and the stator has cooperating nozzles 38, the design of which nozzles is conventional and, therefore, not herein illustrated. The stator is formed with an angular shape to provide an annular chamber 39 and a fitting 40 communicates with this chamber and with a source of compressed air so that air under pressure may be delivered to the chamber. While air is referred to herein as the actuating fluid for the turbine, other gaseous substances may be used if desired. Air entering the chamber 39 completely surrounds the stator and upon passing through the blades 38 and 37 imparts rotation to the rotor, the shaft 15 to which it is fixed and the drum 18 which carries the film. Since this assembly is designed for rotation at speeds as high as several hundred revolutions per second, the heat of friction must be rapidly dissipated in order to enable practical operation of the camera. To make this possible, the end wall of the drum 18 is formed at a slight angle corresponding to the angle of the portion 12 of the housing with sufficient space between the drum and the housing to let the exhaust from the turbine pass between them and outwardly through ports 42, a plurality of which are arranged throughout the periphery of the housing opposite the space 43 which exists between the drum and the housing. Since a large quantity of air or approximately 100 cubic feet per minute at 150 pounds per square inch is required to attain the desired speed of the camera adequate cooling is obtained in this manner.

In order to register the speed at which the camera is operating to enable proper adjustment of the lens as well as for other purposes, a speed indicator is provided in the form of an armature 45, also shown in FIG. 2, which embraces the shaft at a point where a magnetic area illustrated in dotted lines at 47 in FIG. 2 has been established in the shaft. Rotation of the shaft, therefore, induces a current in a coil 48 on the armature and a volt meter 50 registers the value of this current and may be calibrated for example in feet per second so that the linear speed of the film is known. Thus the volt meter acts as a speed indicator for the film. The same circuit may also include an electronic counter as indicated at 51 to record the sine waves or pulsations of the electric current generated thus indicating the exact number of revolutions of the shaft and drum. The volt meter is sufficiently accurate to enable adjustment of the lens but precise speed may be calculated from the reading of the electronic counter to enable intelligent evaluation of the recorded image.

FIG. 3 is a representation of a piece of film upon which a vertically disposed stick of pentolite or other explosive has been exposed as it burns from the bottom upwardly producing a plot which starts at the point 54 progressing upwardly to the point 55. The film is exposed in a smear as indicated in the area 56 but the line between the points 54 and 55 may be used in determining the time and regularity with which the explosive was consumed. Since the vertical coordinate indicates space and the horizontal coordinate indicates time any variation in the constancy of burning would be shown by an irregularity in the line 54—55.

Cameras constructed in accordance with the present invention have operated successfully at a film speed as high as 1,000 feet per second which is several hundred feet per second faster than other known cameras of this general type and this operation can be sustained for 20 seconds or longer without ill effect either to the film or camera as a result of undispersed heat.

I claim:
1. In a high speed camera of the character described, a housing for a rotary film drum, an interconnecting and concentric housing for a turbine, a rotatable shaft extending coaxially through both housings, a film drum on the shaft, a turbine rotor on the shaft whereby operation of the turbine will effect rotation of the drum, and passages for directing exhaust air from the turbine against the drum and outwardly through the walls of the drum housing.

2. In a high speed camera in which film is carried by a rotating drum, a cylindrical housing for the drum, a smaller cylindrical housing for a turbine concentric with the drum housing and opening thereinto, an annular wall connecting the housings and disposed closely adjacent the base of the drum, a turbine stator and a turbine rotor in the turbine housing, means connecting the rotor and the drum for simultaneous rotation, means for introducing air under pressure into the turbine housing to effect such rotation, and means for exhausting said air through the drum housing between the base of the drum and said adjacent wall.

References Cited in the file of this patent

UNITED STATES PATENTS

| | | |
|---|---|---|
| 1,837,705 | Dina | Dec. 22, 1931 |
| 1,957,172 | Kindenmann et al. | May 1, 1934 |
| 2,116,704 | Laube et al. | May 10, 1938 |
| 2,259,228 | Rankin | Oct. 14, 1941 |
| 2,428,719 | Nemeth | Oct. 7, 1947 |
| 2,494,082 | Baird | Jan. 10, 1950 |
| 2,537,900 | Lee et al. | Jan. 9, 1951 |
| 2,575,020 | Lee et al. | Nov. 13, 1951 |
| 2,604,376 | Tuttle et al. | July 22, 1952 |

FOREIGN PATENTS

| | | |
|---|---|---|
| 674,097 | France | Oct. 15, 1929 |

OTHER REFERENCES

Jones, G. A. "High Speed Photography," published in 1952 by Chapman & Hall, Ltd., London, pages 190, 191 cited.

Chesterman, W. D. "Photographic Study of Rapid Events," published in 1951, Oxford University Press, London, pages 94, 95 cited.